March 19, 1963   J. V. JOHNSON   3,082,315
PROCESS OF PRODUCING A WELDED STRUCTURE
Filed April 10, 1959

INVENTOR.
JOHN V. JOHNSON
BY
ATTORNEYS

United States Patent Office 3,082,315
Patented Mar. 19, 1963

3,082,315
PROCESS OF PRODUCING A WELDED
STRUCTURE
John V. Johnson, Minneapolis, Minn., assignor to Cargill, Incorporated, Minneapolis, Minn., a corporation of Delaware
Filed Apr. 10, 1959, Ser. No. 805,624
5 Claims. (Cl. 219—91)

This invention relates to a welding structure and the process of producing the same. More particularly this invention relates to a method of welding steel sheets together, particularly planar aluminized sheets, by fusion, and the structure produced thereby.

It has been discovered that in the welding of sheet steel plates together, as in welded building structures and the like, there has remained the problem of providing a weld of sufficient strength. This has been found to be particularly true with reference to aluminized steel.

When sheets are overlapped and welded together by means of fusion, it has been discovered that the sheer strength of the weld, while fairly good, is inadequate but that the peel strength of the weld is totally inadequate, the sheets being able to be separated relatively easily by peeling the top sheet from the bottom sheet and the top sheet tearing at the weld. This poor holding power and tendency to peel has made the welds so formed unreliable.

In such welding of aluminized sheets, i.e. sheets of mild steel having an aluminum coating, it has been found highly desirable to scrape away the aluminum coating for each of the sheets at the spot to be welded. This, of course, is extremely time consuming, an expensive use of labor and impractical in any fabricating operation.

It is therefore an object of this invention to provide a new and useful method of welding superimposed sheets.

It is a further object of this invention to provide a new and useful method of welding aluminized steel sheets.

Yet a further object of this invention is to provide a new and useful method of fusion welding superimposed flat sheets including use of a cover member.

Still a further object of this invention is the provision of a new and useful method of fusion spot welding aluminized steel sheets by a shielded helium arc method in which a cover member is employed.

Still a further object of this invention is the method of providing a welded structure comprising lapping planar sheet portions in superimposed relationship, each consisting of aluminized steel, positioning a separable backing sheet member of steel on one side thereof and positioning a cover sheet of metal over one of said first planar sheet portions, fusion welding said three portions together by establishing an electric arc between an external member and said cover sheet to fuse said three sheets together.

Still a further object of this invention is the provision of a welded structure as produced according to the foregoing objects.

Other objects are those inherent and apparent in the welded structure and method as described, pictured and claimed.

This invention will be described with reference to the drawings in which corresponding numerals refer to the same parts and in which.

Figure 1:
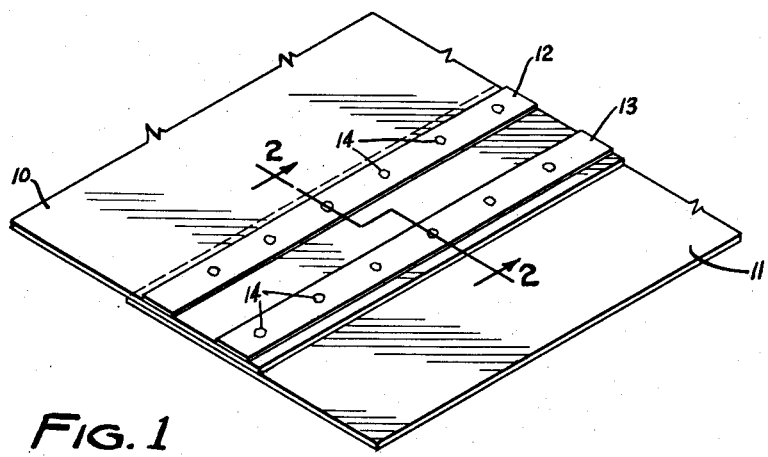
FIGURE 1 is an isometric view of a welded structure produced according to the instant invention.

Broadly stated, this invention comprises a method of providing a welding structure (and the welded structure so provided) in which two superimposed sheets are fusion welded together through a cover strip. The method has been found to be particularly effective in the welding of aluminized steel sheets and to produce a satisfactory weld between aluminized steel sheets—which otherwise would not be able to be welded together. In this method, it is preferred to provide a backing plate of thicker material such as mild steel to dissipate heat generated by the weld and to prevent the welded portion of the bottom sheet from becoming contaminated by external material. The invention has been found particularly useful in welding flat sheets but it is to be understood that other sheets, curved or the like, can be likewise welded within the spirit and scope of this invention.

The fusion welding is preferably accomplished by the use of an inert gas-shielded tungsten-arc spot welding gun such as that known by the mark "Aircospot" and available from Air Reduction Company. This is a water cooled tungsten arc device which produces spot welds similar to those made by resistance spot welding. It uses an inert gas-shielded (usually helium shielded) tungsten arc to join the material being welded, the weld and the electrode being fully protected from atmospheric contamination during welding by the inert gas shield. It is preferred to use such welding gun or device since an automatic circuit starts the flow of inert shielding gas, such as helium, starts a flow of water or other coolant for cooling the gun itself, brings an electrode, such as thoriated tungsten electrode, into contact with the work to establish the arc and automatically retracts the electrode to provide an arc of preset length. An adjustable timer is provided which extinguishes the arc at the proper time interval.

While such automatic welding device or gun is preferred, it is to be understood that any suitable method of providing a fusion weld may be used, such as provided by a manually operated tungsten arc, a resistance spot welding machine, etc.

In providing such welds, particularly on aluminized steel, but without the method of this invention, it was found that a mound would form in the center of the weld where the electrode or rod hit the steel and an annular crater would form around that mound. While such weld would provide a reasonable sheer test, the metal would peel right at the crater, tearing out of the sheet and the inner part of the spot would stay with the bottom sheet.

By the use of a copper or chrome-clad cover sheet it was found possible to increase the peel test rating as much as 90–100 pounds over that resulting when said cover sheet was not employed. It was also found that the sheer test rating was markedly improved. As the cover sheet, copper, chrome-clad steel or mild steel or aluminized steel were found to produce markedly improved results although the copper and chrome-clad steel were superior.

Figure 2:
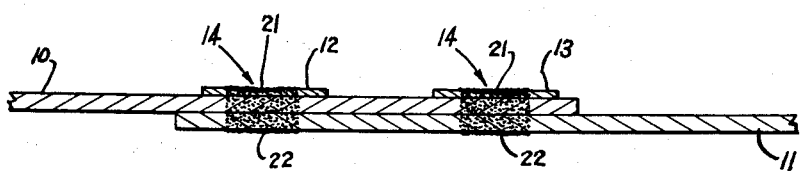
FIGURE 2 is an enlarged cross-sectional view taken along the line and in the direction of the arrows 2—2 of FIGURE 1.

The welded structure of the instant invention is shown in FIGURES 1 and 2. There is shown a top sheet 10 having an edge lapped over the adjacent edge of an identical bottom sheet 11. A pair of cover sheets or strips 12 and 13 are positioned over sheet 11 and a plurality of welds 14 is made through them and sheets 12 and 13, fusing the entire assembly into a laminae of bottom sheet 11, top sheet 10 and cover sheets 12 and 13. While cover sheets 12 or 13 are shown as elongated planar strips, it is of course to be understood that cover sheets of any other configuration, individual or continuous, may be utilized within the scope of this invention, so long as they cover the welds and extend beyond the welded portion.

Figure 3:
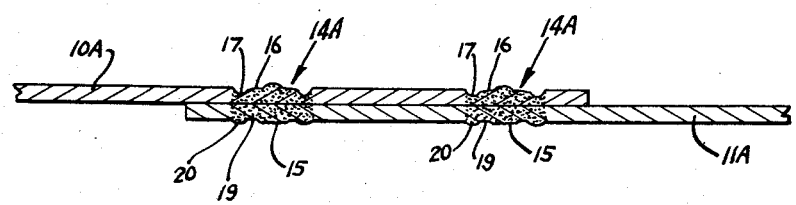
FIGURE 3 is a view similar to FIGURE 2 but shows a conventional fusion weld.

The fusion welds accomplished by the utilization of the cover sheets 12 and 13 are found to be substantially stronger than if these cover sheets were not used. In FIGURE 3, there is shown a fusion weld for sheets 10A and 11A, the welds being initiated at 14A. The welds so made, without the cover sheet, were found to have a central hump or top, an annular slightly declined or sloped portion 16 and an annular peripheral crater 17, all on the top surface of the sheet 10A where the electrode contacts the sheet. The bottom of the weld on sheet 11A, by inspection, was found to have a flattened central portion 15 and an annular crater 19 slightly smaller in diameter than the crater 17 surrounded by a slightly bulged peripheral portion 20. In peel tests, it was found that the top sheet 10A would readily peel from the bottom sheet 11A, tearing at the crater 17.

The weld produced by the use of the cover sheets 12 and 13 as shown in FIGURE 2, while producing rough top and bottom surfaces 21 and 22, appears, for some reason for which the explanation is not known, to be flattened out and any craters or peaks appear to have been minimized to a surface roughness.

It is not known precisely why the use of the cover sheet provides such a markedly improved weld and method of welding. It is believed that the use of the cover sheet minimizes the formation of craters and thus forms a much stronger weld. Further, it is believed that the use of a cover sheet absorbs any craters that are formed and thus strengthens the weld between the two layers 10 and 11. Although the cover sheets 12 and 13 have been found to be securely attached to the sheet 10, any weakness between sheets 10 and 12 or 13 does not affect the strength between sheets 10 and 11. It is further believed that the use of the cover sheet tends to provide a transfer of any peel stress from the sheet 10 more gradually to the weld so that transfer is not so abrupt and there is not as great a tendency to pull the small spot of the weld out of the sheet.

In an exemplary weld made according to the method of the instant invention, two sheets of "Armco" aluminized steel, made by Armco Steel Company, of .0276 inch thickness and four feet in width were joined together by lapping the sheets five inches. A double row of welds was provided spaced three inches apart, and each row was provided with a plurality of welds on two inch centers. A back-up plate of 12 gauge black iron was positioned beneath the bottom sheet and a strip of 16 ounce per square foot copper was placed on the top sheet prior to welding. A weld was then formed by use of a helium shielded arc by an "Aircospot" gun manufactured by Air Reduction Company, the weld being initiated by engagement of the negative electrode against the copper where the steel sheets were connected to the positive terminal, and maintained for 1/3 second. A direct current of 172 amperes was used and shielded with a helium shield of 14 cubic feet per hour rate.

In a second exemplary test, a three quarter inch wide chrome-clad steel was positioned over each row of welds, the strip being of 13 mil thick chrome-clad steel having chrome coating on each side of 4 mils.

It was subsequently determined that common or mild steel and aluminized steel could be used as a cover sheet but with less marked results.

It was determined that the shielding can be accomplished by a stream of helium directed at the weld in the range from 6–20 cubic feet per hour with a preferred delivery rate of 14 cubic feet per hour. The current strength can be varied between 150–250 amperes with a preferred setting of 225 amperes. The time range was found to be adequate from 1/4 to 5/12 second with a preferred choice of 1/3 second. As an electrode, a 1/8 inch in diameter thoriated tungsten rod was utilized. It was found that steel from 14 to 22 gauge can be satisfactorily welded with such cover plate and a back-up plate of 9–12 gauge metal of any material suitable for dissipating heat and not contaminating the weld can be utilized.

The chromium-clad strip used was chosen of a stainless steel metal strip having .05% carbon, .38% silicon, .48% manganese, .05% phosphorus, .03% sulfur, 3.77% nickel, 17.15% chromium and .18% molybdenum.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. The method of providing a welded structure which comprises lapping two planar sheet portions in superimposed relationship, positioning a cover sheet of metal over one of said first planar sheet portions, fusion welding said three portions together by establishing an electric arc between an external member and said cover sheet.

2. The method of providing a welded structure which comprises lapping two planar sheet portions in superimposed relationship, positioning a backing sheet member on one side thereof, positioning a cover sheet of metal over one of said first planar sheet portions, fusion welding said three portions together by establishing an electric arc between an external member and said cover sheet, and removing said backing sheet.

3. The method of providing a welded structure which comprises lapping two planar sheets in superimposed relationship, each sheet consisting of aluminized steel, positioning a cover sheet of metal selected from the group consisting of chromium-clad stainless steel and copper over one of said first planar sheet portions, fusion welding said three portions together by establishing an electric arc between an external member and said cover sheet.

4. The method of welding two aluminized steel sheets together which comprises interposing a metal cover sheet between an aluminized sheet and an electrode generating a welding arc.

5. A method of welding aluminized steel sheets together comprising, overlapping portions of said aluminized steel sheets, covering the overlap portions of said aluminized sheets with a cover sheet of steel containing .05% carbon, .38% silicon, .48% manganese, .05% phosphorus, .03% sulfur, 3.77% nickel, 17.15% chromium and .18% molybdenum, welding said aluminized sheets and cover sheet together by establishing an electric arc between said cover sheet and the electrode of an arc welding device.

References Cited in the file of this patent
UNITED STATES PATENTS

| | | |
|---|---|---|
| 1,094,141 | Gnuchtel | Apr. 21, 1914 |
| 1,568,080 | Meadowcroft | Jan. 5, 1926 |
| 2,305,397 | Watter | Dec. 15, 1942 |
| 2,481,614 | Redmond | Sept. 13, 1949 |
| 2,679,305 | Gunthorp | May 25, 1954 |
| 2,822,897 | Peterson | Feb. 11, 1958 |